(12) United States Patent
Kea et al.

(10) Patent No.: US 6,337,804 B1
(45) Date of Patent: Jan. 8, 2002

(54) MULTILEVEL PWM VOLTAGE SOURCE INVERTER CONTROL AT LOW OUTPUT FREQUENCIES

(75) Inventors: Eugene F. Kea, Boones Mill; Fei (Fred) Wang, Blacksburg; James M. Nowak; David Smith, both of Roanoke, all of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/669,273

(22) Filed: Sep. 26, 2000

(51) Int. Cl.[7] ........................................... H02M 7/5387
(52) U.S. Cl. ..................................................... 363/132
(58) Field of Search ............................. 363/16, 17, 95, 363/97, 98, 56.01, 56.02, 131, 132

(56) References Cited

U.S. PATENT DOCUMENTS

| | | | | |
|---|---|---|---|---|
| 5,621,628 A | * | 4/1997 | Miyazaki et al. | 363/37 |
| 5,684,688 A | | 11/1997 | Rouaud et al. | 363/132 |
| 5,790,396 A | | 8/1998 | Miyazaki et al. | 363/96 |
| 5,910,892 A | * | 6/1999 | Lyons et al. | 363/98 |
| 5,982,646 A | * | 11/1999 | Lyons et al. | 363/58 |
| 6,058,031 A | * | 5/2000 | Lyons et al. | 363/67 |

* cited by examiner

Primary Examiner—Matthew Nguyen
(74) Attorney, Agent, or Firm—Hunton & Williams

(57) ABSTRACT

A multilevel voltage source inverter and related control scheme in which a VSI controller operates in a low frequency mode of operation below a threshold operating frequency to more evenly distribute the duty cycle and thermal loss of the VSI switches. The technique makes use of multiple alternative switching states which achieve the same output voltage.

32 Claims, 2 Drawing Sheets

MULTILEVEL PWM VOLTAGE SOURCE INVERTER CONTROL AT LOW OUTPUT FREQUENCIES

FIELD OF THE INVENTION

The present invention generally relates to voltage source inverters. More particularly, the present invention relates to control techniques for pulse width modulation (PWM) voltage source inverters.

BACKGROUND OF THE INVENTION

Multilevel pulse width modulation (PWM) voltage source inverters are useful in a variety of applications, and function generally to provide a specific voltage output on a multilevel DC bus. A typical voltage source inverter includes a number of semiconductor switches connected between the positive DC bus and the negative DC bus, and a controller is operatively coupled to control the semiconductor switches to achieve a desired output voltage on the multilevel DC bus.

Numerous techniques to control the semiconductor switches are known. For example, U.S. Pat. No. 5,790,396 discloses a neutral point clamped (NPC) inverter control system which includes a DC power source to output DC voltage having a neutral point, an NPC inverter to convert the DC voltage into AC voltage in three phases through PWM control, a mode selecting unit to decide a first and a second PWM modes by comparing amplitude of voltage reference with a prescribed value that is defined by a minimum pulse width, a first voltage reference conversion means to add a prescribed bias value at which a polarity changes to positive/negative within a fixed period to secure the minimum pulse width to voltage references in respective phases in a first PWM mode, a second voltage reference conversion means to fix the voltage reference in one phase by a value that secures the minimum pulse width when voltage reference in one phase is smaller than a prescribed value that is defined by the minimum pulse width in a second PWM mode and correct voltage references of other two phases so as to make line voltage to a value corresponding to the voltage reference, and a modulation frequency change-over means to lower PWM control modulation frequency in the first PWM mode and to suppress power loss caused by switching in the first PWM mode. In this control system, the PWM frequency is lowered to suppress power loss.

Another control technique is disclosed in U.S. Pat. No. 5,684,688. This patent discloses a three-level NPC inverter topology including two auxiliary resonant commutation circuits which are controlled to clamp the voltage across each main inverter switch to zero voltage prior to altering the state of the switch in order to achieve soft switching of all main inverter switches while reducing output voltage harmonics and gradients. In this technique, a soft switching control scheme is provided by added control circuitry to reduce power losses in the switches.

Other control schemes are believed to include de-rating the inverter at a low frequency by lowering the maximum current output of the inverter, and using a stall protection based on an inverter thermal model to predict device temperatures, which will generate a fault shutdown of the inverter if device temperature limits are exceeded.

Control schemes such as those described above do not address the problem of switch control at lower VSI frequencies. At high frequencies, switches change state frequently. At lower frequencies, the switches change state less frequently; thus, certain switches may be held in an active state for a increased period of time. This results in increased thermal losses for certain switches, and limits the inverter current capability at these lower frequencies.

SUMMARY OF THE INVENTION

It would be desirable for a voltage source inverter to be controlled in such a manner that the inverter current capability can be maximized at lower VSI frequencies. It would also be desirable to avoid an uneven distribution of thermal losses for the VSI switches. It would further be desirable to provide improved switch control without adding additional control circuitry.

The present inventions overcomes the disadvantages noted above, and achieves additional advantages, by providing for a voltage source inverter which includes a DC link, a plurality of switches connected in series between the positive and negative dc buses for each phase, and a controller operatively connected to a gate on each of the switches; in the embodiments described below, the controller operates to gate the switches in a substantially uniform manner such that each switch in the plurality of switches has a substantially uniform duty cycle at frequencies below a threshold frequency. The controller makes use of multiple switching states which achieve the same output voltage. The controller minimizes the dwell time of at least one (e.g., zero vector) switching state by maintaining the dwell time below a dwell time threshold. At higher frequencies, the VSI controller can operate according to a standard control technique.

The present invention thus provides a relatively uniform duty cycle for each switch at lower frequencies, thereby avoiding uneven thermal distribution and maximizing the inverter current capability at lower frequencies. The present invention also avoids the use of additional circuitry.

BRIEF DESCRIPTION OF THE DRAWINGS

The present invention can be more fully understood by reading the following Detailed Description of presently preferred embodiments together with the accompanying drawings, in which like reference indicators are used to designate like elements, and in which.

DETAILED DESCRIPTION

Figure 1:
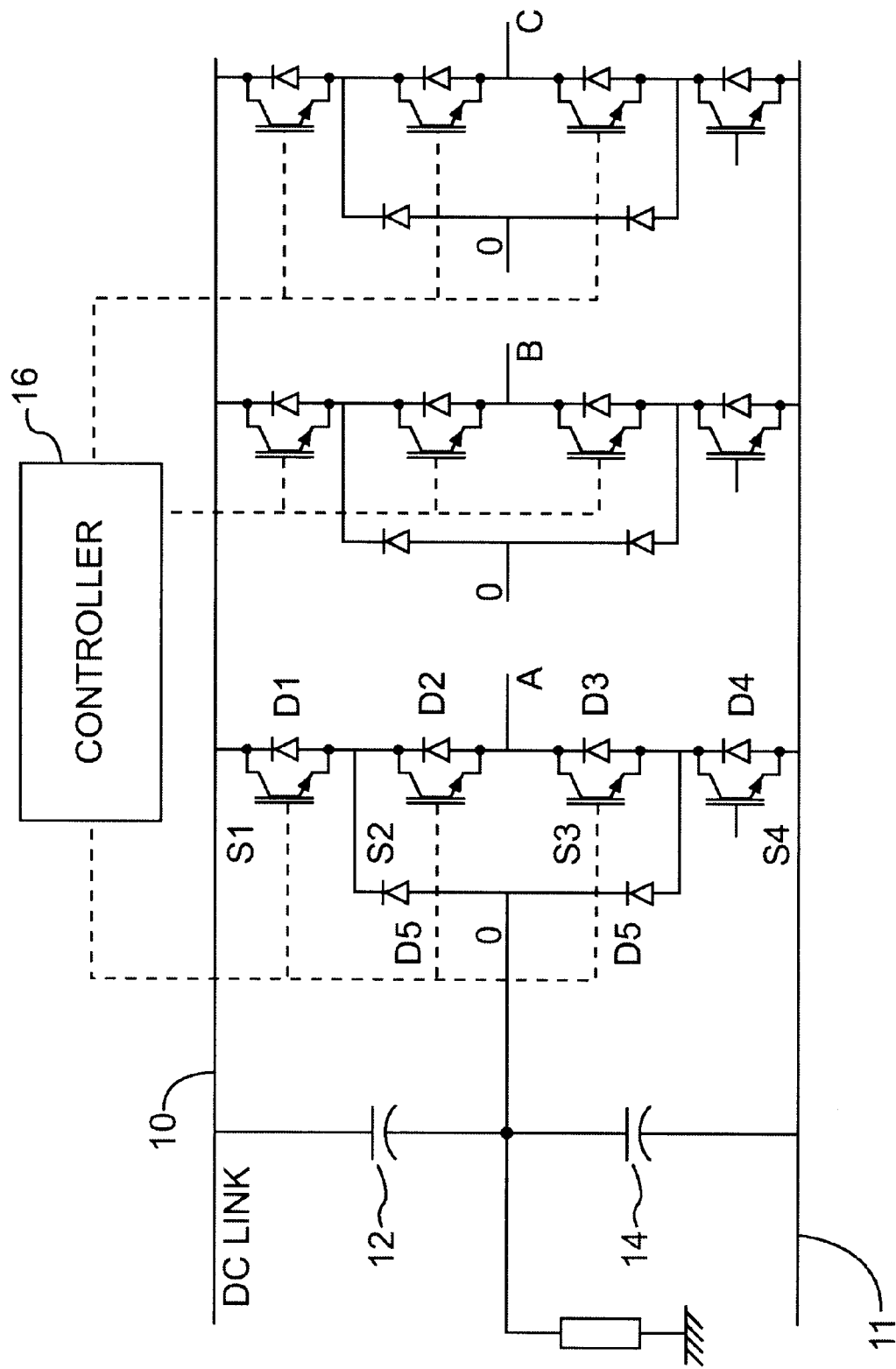
FIG. 1 is a block diagram of an exemplary voltage source inverter in which the control technique of the present invention can be implemented.

Referring now to FIG. 1, a circuit diagram of a conventional three-phase, three-level, neutral-point-clamped (NPC) voltage source inverter is shown. It will be appreciated that the circuit of FIG. 1 is but one example of a circuit in which the control techniques of the present invention can be implemented. In the circuit of FIG. 1, a constant voltage is maintained on a bus 10 connected to a DC link, and this voltage is equally divided between upper and lower capacitances 12 and 14, respectively. The circuit includes a plurality of switches (S1, S2, S3, S4) connected in series between the positive DC bus 10 and the negative DC bus 11. Each switch has a corresponding diode (D1, D2, D3, D4) associated with it. It will be appreciated that in the circuit of FIG. 1, there is such an arrangement of switches and switching diodes for each phase (in this example, the three phases are designated as A, B, and C; only the circuit elements for phase A are described for purposes of explanation). There are also provided clamping diodes D5 and D6 connected in series between a first node between switches S1 and S2, and a second node between switches S3 and S4. A clamping node between diodes D5 and D6 is connected to a node between the capacitances 12 and 14, and to a grounding resistance 15. The gate of each switch is operatively coupled to receive a control signal from a PWM controller 16; it will be appreciated that the connections between the controller 16 and the switches is not shown for ease of illustration and explanation.

In the arrangement of FIG. 1, each output phase (A, B, C) can have three possible voltage states: 1) a positive (+) state when the upper two switches S1 & S2 are on (and the other switches are off); 2) a negative (−) state when the lower two switches S3, S4 are on (and the other switches are off); 3) a neutral (0) state when the middle two switches S2, S3 are on (and the other switches are off). To achieve a required three-phase output voltage, switch states in all three phases are coordinated properly by control signals generated and supplied by the PWM controller 16. Thus, an output state for the three phases can be represented as xyz, where x, y, and z are one of (0), (+), or (−).

Figure 2:
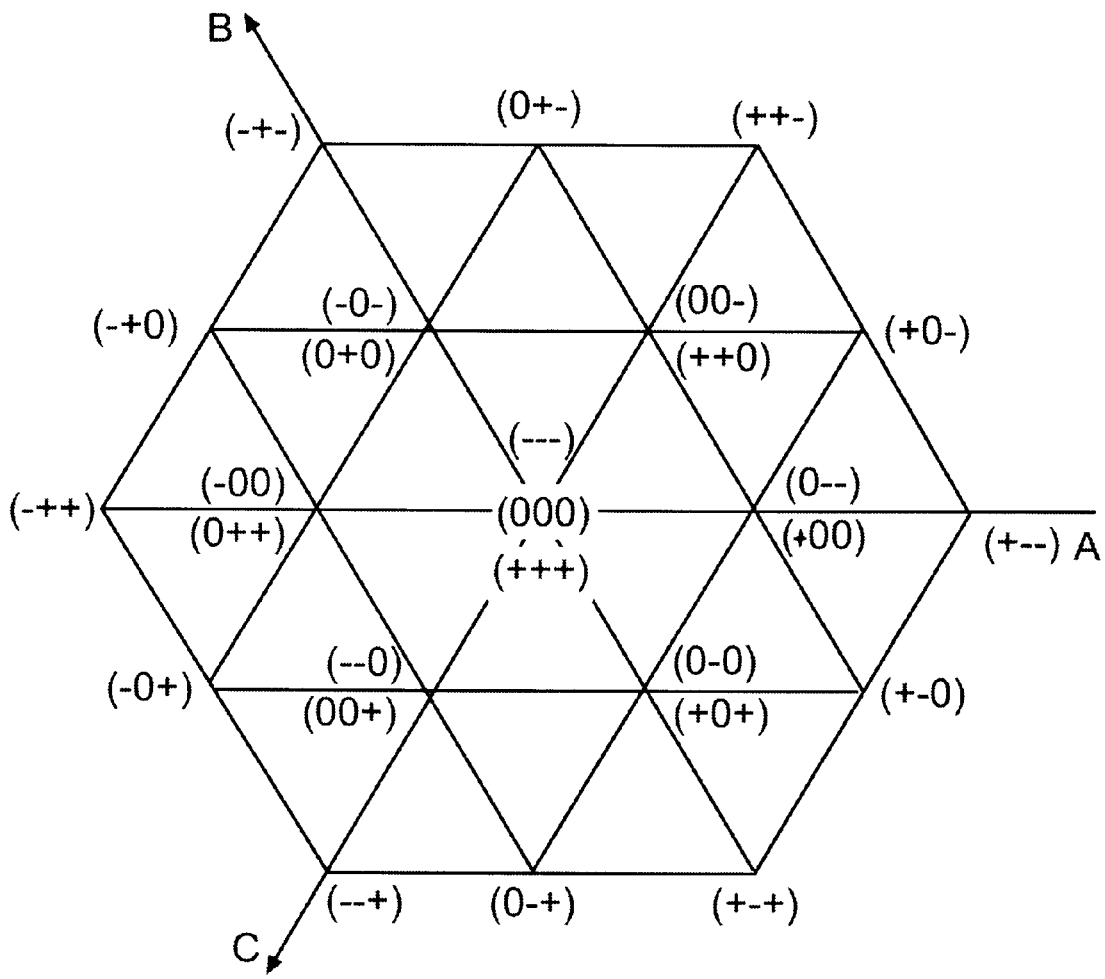
FIG. 2 is a three-level space vector diagram illustrative of control vectors for three-level, three-phase systems.

FIG. 2 shows a space vector diagram which illustrates a modulator scheme for the three-level three-phase system of FIG. 1. Each vector on the diagram of FIG. 2 represents a balanced three-phase voltage, and each node of the diagram represents an available switching vector. Many switching vectors can be achieved by multiple switching states (that is, multiple combinations of open and closed switches); for example, vector 0 can be achieved by three different switching states, 000, +++, or −−−. In other words, any of these switching combinations will result in an identical output state on phase A. An optimal way to synthesize an arbitrary voltage vector such as V1 is to use the three adjacent vectors, in this case, vectors 0, 1 and 2 (states 000, 00+, and 0+0). The scheme is optimal because it produces the smallest possible voltage errors, harmonics, and switching losses. The actual dwell times in each vector are preferably determined by a modulator algorithm designed to ensure the smallest voltage error over a PWM cycle. Obviously, a vector close to switching vector 0 will have a long dwell time in vector 0. In a conventional mode of operation, at typical operating frequencies that are not very low, the voltage vector will rotate through the vector space of FIG. 2 quickly, and the switches change state quickly. This results in a relatively even distribution of the duty cycles for the switches. At relatively low frequencies however, voltage vectors tend to change very slowly, such that certain switches have much heavier duty cycles during a given period of time. The extreme case is a Direct Current (DC) voltage, which corresponds to a stationary voltage vector.

Assuming that the magnitude of the voltage vector is near zero, often the case in inverter applications requiring constant volts per hertz ratio, the inverter will dwell mostly at vector 0. Using the conventional optimal centered space vector modulation scheme described above, the switching sequence for the near zero vector will be from (000) to (+00) to (++0) to (+++) for the first PWM cycle, and then from (+++) to (++0) to (+00) to (000) for the second cycle, and then from (000) to (00−) to (0−−) to (−−−) for the third cycle, and then from (−−−) to (0−−) to (00−) to (000) for the fourth cycle. The dwell times in each of these states in every transition are substantially the same. In this control scheme, the inner switches S2 and S3 (and diodes associated with them), which are conductive and open in (000) as well as (+++) or (−−−), have a duty cycle up to 75%. The outer switches S1 & S4 have a duty cycle on the order of 25%. This uneven distribution contributes to the inverter rating problem at the low or zero frequencies.

According to an embodiment of the present invention, the controller 16 is suitably programmed to skew the dwell time distribution in the switching sequence at frequencies below a threshold frequency. Continuing with the example described above, the controller 16 can determine when the operating frequency of the VSI is below the threshold, and enter an alternative mode of operation in which the controller will favor the (+++) and (−−−) states, and minimize the dwell times for the (000) state. As a result, all four switches can have substantially uniform (about 50%) duty cycles, a much more uniform distribution and 50% improvement from conventional control techniques. It will be appreciated that the duty cycles of clamping diodes (D5 & D6) are reduced even more. When the controller 16 determines that the operating frequency has exceeded the threshold frequency value, the controller 16 can operate in a default mode which can be an otherwise conventional control technique.

According to one embodiment of the present invention, the threshold frequency is approximately the reciprocal of three bridge thermal time constants. Typically this frequency will be about 5 hertz.

A voltage source inverter according to one embodiment of the present invention can control the switches such that a dwell time in at least one switching state can be less than a maximum dwell time. One exemplary maximum dwell time can be defined as the larger of the minimum on time and the minimum off time for the device. Such times can be on the order of 30 $\mu$sec or less.

The foregoing description includes numerous details that have been provided for purposes of explanation only. These details are not to be construed as limitations of the invention. The details and examples presented above can be readily modified without departing from the spirit and scope of the invention, as defined by the following claims and their legal equivalents.

What is claimed is:

1. A voltage source inverter, comprising:
   a DC link;
   a plurality of switches connected in series between the positive and negative dc buses for each phase;
   a controller operatively connected to a gate on each of the switches, the controller operating to gate the switches in a substantially uniform manner such that each switch in the plurality of switches has a duty cycle of approximately 50% at frequencies below a threshold frequency.

2. The voltage source inverter of claim 1, wherein the plurality of switches includes four switches.

3. The voltage source inverter of claim 1, wherein the threshold frequency is approximately the reciprocal of three bridge thermal time constants.

4. The voltage source inverter of claim 1, further comprising a switch diode associated with each switch.

5. The voltage source inverter of claim 1, further comprising one or more clamping diodes associated with each phase.

6. The voltage source inverter of claim 1, further comprising a plurality of capacitances connected in series between the DC link positive bus and the negative bus and ground.

7. The voltage source inverter of claim 1, wherein the controller further operates in a second mode at frequencies above the threshold frequency to gate the switches according to a predetermined algorithm.

8. The voltage source inverter of claim 1, wherein the controller further controls the plurality of switches such that a dwell time in at least one switching state is less than a maximum dwell time threshold.

9. The voltage source inverter of claim 8, wherein the maximum dwell time is the larger of a minimum on time and a minimum off time for the device, typically 30 μsec or less.

10. The voltage source inverter of claim 8, wherein the at least one switching state is a zero vector state.

11. A method for controlling a plurality of switches in a voltage source inverter, comprising:

operating the switches according to a first algorithm in a first mode of operation; and operating the switches according to a second algorithm in a second mode of operation when the voltage source inverter is operating below a threshold frequency, such that the switches have a substantially uniform duty cycle in the second mode of operation.

12. The method of claim 11, wherein the threshold frequency is approximately the reciprocal of three bridge thermal time constants.

13. The method of claim 11, wherein substantially uniform duty cycle is approximately 50% for each of the plurality of switches.

14. The method of claim 11, wherein the dwell time in at least one switch state is less than a maximum threshold dwell time.

15. The method of claim 14, wherein the maximum threshold dwell time is the larger of a minimum on time and a minimum off time for the device.

16. The method of claim 14, wherein the at least one switch state includes a zero vector state.

17. A method for controlling a plurality of switches in a voltage source inverter, comprising the steps of:

determining an operating frequency of the voltage source inverter;

operating the switches according to a first algorithm in a first mode of operation if the operating frequency is above a threshold frequency; and operating the switches according to a second algorithm in a second mode of operation if the operating frequency is below the threshold frequency, such that the switches have a substantially uniform duty cycle in the second mode of operation.

18. The method of claim 17, wherein the threshold frequency is approximately the reciprocal of three bridge thermal time constants.

19. The method of claim 17, wherein substantially uniform duty cycle is approximately 50% for each of the plurality of switches.

20. The method of claim 17, wherein the dwell time in at least one switch state is less than a maximum threshold dwell time.

21. The method of claim 20, wherein the maximum threshold dwell time is the larger of a minimum on time and a minimum off time for the device.

22. The method of claim 20, wherein the at least one switch state includes a zero vector state.

23. A voltage source inverter, comprising:

a DC link;

a plurality of switches connected in series between the dc link and ground for each phase;

a controller operatively connected to a gate on each of the switches, the controller operating to gate the switches in a substantially uniform manner such that each switch in the plurality of switches has a substantially uniform duty cycle at frequencies below a threshold operating frequency of the voltage source inverter.

24. The voltage source inverter of claim 23, wherein the plurality of switches includes four switches.

25. The voltage source inverter of claim 23, wherein the threshold frequency is approximately the reciprocal of three bridge thermal time constants.

26. The voltage source inverter of claim 23, further comprising a switch diode associated with each switch.

27. The voltage source inverter of claim 1, further comprising one or more clamping diodes associated with each phase.

28. The voltage source inverter of claim 1, further comprising a plurality of capacitances connected in series between the DC link and ground.

29. The voltage source inverter of claim 1, wherein the controller further operates in a second mode at frequencies above the threshold frequency to gate the switches according to a predetermined algorithm.

30. The voltage source inverter of claim 1, wherein the controller further controls the plurality of switches such that a dwell time in at least one switching state is less than a maximum dwell time threshold.

31. The voltage source inverter of claim 30, wherein the maximum dwell time is the larger of a minimum on time and a minimum off time for the device (typically 30 μsec or shorter).

32. The voltage source inverter of claim 30, wherein the at least one switching state is a zero vector state.

* * * * *